United States Patent
Kepplinger et al.

[11] Patent Number: 6,149,708
[45] Date of Patent: Nov. 21, 2000

[54] PROCESS FOR PRODUCING SPONGE IRON

[75] Inventors: Werner Leopold Kepplinger, Leonding; Felix Wallner; Udo Gennari, both of Linz, all of Austria

[73] Assignee: Voest-Alpine Industrieanlagenbau GmbH, Linz, Austria

[21] Appl. No.: 09/101,208
[22] PCT Filed: Nov. 5, 1997
[86] PCT No.: PCT/AT97/00238
 § 371 Date: Aug. 4, 1998
 § 102(e) Date: Aug. 4, 1998
[87] PCT Pub. No.: WO98/20172
 PCT Pub. Date: May 14, 1998

[30] Foreign Application Priority Data

Nov. 6, 1996 [AT] Austria .................................. 1932/96

[51] Int. Cl.⁷ .................................................. C21B 13/14
[52] U.S. Cl. ........................................ 75/446; 75/450
[58] Field of Search ............................ 75/450, 444, 505, 75/961, 491, 492, 446; 266/156

[56] References Cited

U.S. PATENT DOCUMENTS

| | | | |
|---|---|---|---|
| Re. 32,247 | 9/1986 | Stephens, Jr. ................................ | 75/11 |
| 4,111,687 | 9/1978 | Syska ......................................... | 75/13 |
| 4,578,110 | 3/1986 | Price-Falcon et al. ...................... | 75/34 |
| 5,137,566 | 8/1992 | Stephens, Jr. et al. .................... | 75/507 |
| 5,338,336 | 8/1994 | Greenwalt ................................ | 75/445 |
| 5,413,622 | 5/1995 | Greenwalt ................................ | 75/446 |
| 5,514,203 | 5/1996 | Grünbacher et al. ..................... | 75/961 |
| 5,785,733 | 7/1998 | Lee et al. ................................. | 75/450 |

FOREIGN PATENT DOCUMENTS

| | | |
|---|---|---|
| 0094707 | 11/1983 | European Pat. Off. . |
| 0179734 | 4/1986 | European Pat. Off. . |
| 0217331 | 4/1987 | European Pat. Off. . |
| 0594557 | 4/1994 | European Pat. Off. . |
| 4426623 | 7/1995 | Germany . |
| 93/14228 | 7/1993 | WIPO . |

*Primary Examiner*—Melvyn Andrews

[57] ABSTRACT

A process for producing sponge iron by directly reducing particulate, iron-oxide-containing material, wherein reducing gas that is formed from carbon carriers and an oxygen-containing gas in a melt-down gasifying zone is introduced into a reduction zone that contains the iron-oxide-containing material, characterized by the combination of the following characteristic features: (i) to the reduction zone, a reducing gas is fed which contains between iron-oxide-containing material 20 g and 100 g per $Nm^3$ of a dust having a carbon content of between 30 mass % and 70 mass %; and (ii) the iron-oxide-containing material is exposed to the reducing gas for a time period that exceeds the period for a complete reduction. The process of the invention renders it possible to produce a sponge iron of elevated carbon content.

6 Claims, 3 Drawing Sheets

PROCESS FOR PRODUCING SPONGE IRON

The invention relates to a process for producing sponge iron by directly reducing particulate, iron-oxide-containing material, wherein reducing gas that is formed from carbon carriers and an oxygen-containing gas in a melt-down gasifying zone is introduced into a reduction zone that contains the iron-oxide-containing material.

From EP-A -0 594 557, a process is known for producing molten pig iron from charging substances formed of iron ores and fluxes and at least partially comprising fines, wherein the charging substances are directly reduced to sponge iron in at least one reduction zone, the sponge iron is melted in a melting-gasifying zone under supply of carbon carriers and oxygen-containing gas, and a reducing gas is produced which is injected into the reduction zone, is reacted there and is withdrawn as an export gas. With this process it is feasible to use fine ore in an economic manner in that primarily hematite and/or magnetite fine ores and/or ore dusts are subjected to preheating by the fluidized bed method in a preheating zone and the thus preheated charging substances are completely reduced to a major extent in at least one consecutively arranged reduction zone by the fluidized bed method, whereupon the charging substances are charged into the fluidized bed of the melting-gasifying zone by forced conveyance, and are melted there.

A process of the kind initially mentioned is known from EP-A-0 217 331. In that process, a gas is employed for directly reducing fine ore, which gas essentially comprises CO and $H_2$ and has been dedustified in a cyclone.

The sponge iron produced by directly reducing iron-oxide-containing material according to this prior art as a rule has a low carbon content in the amount of about 1%. Yet, for further processing the sponge iron, an elevated carbon content is advantageous, so as to be able to save energy when melting the sponge iron and in the subsequent refining process, without the need for a separate addition of carbon (carburization).

The invention therefore has as its object to modify a process in accordance with the initially described kind in such a manner that the sponge iron will exhibit an elevated carbon content, preferably of a dimension between 1 and 4%, particularly in excess of 2.5%.

According to the invention, this object is achieved by the combination of the following characteristic features:
- to the reduction zone, a reducing gas is fed which contains between 20 and 100 g per $Nm^3$ of a dust having a carbon content of between 30 and 70 mass %, and
- the iron-oxide-containing material is exposed to the reducing gas for a time period that exceeds the period required for complete reduction.

The production of sponge iron having a carbon content of between 0.5 and 2.5% is already known from WO-A-93/14228; more specifically, with this known process, small amounts of natural gas are employed for adjusting the carbon, wherein the natural gas is charged directly into a fluidized bed reactor. But this measure alone is not very efficient, since complete decomposition of the natural gas is not assured at the reduction temperatures envisaged for direct reduction.

From U.S. Pat. No. 5,137,566 it is known to produce highly concentrated iron carbide from iron ore by means of reducing gas and carburizing gas, wherein on account of the time sensitive nature of the iron carbide formation process, a higher residence time is aimed at for the conversion. Just by increasing the residence time of the iron-oxide-containing material in direct reduction a considerable decrease is caused in terms of production, i.e. a substantially reduced output of reduced material per time unit. This method therefore involves fairly great expenditures and, accordingly, the iron carbide thus produced is utilized in steelmaking processes only by way of an addition, whereas the object to be achieved in accordance with the invention is that all of the sponge iron utilized for making steel is to have an elevated carbon content, i.e. the sponge iron of elevated carbon content that is thus produced is not just used as an addition in a steelmaking operation but itself constitutes the base material for it.

From U.S. Pat. No. Re-32,247 it is known to convert iron-oxide-containing material to iron carbide in a first step and to directly produce steel from the iron carbide in a second step. With this known method, an hydrogen-containing reducing gas is employed for reduction, and a carbon-containing material for the formation of iron carbide. One disadvantage associated with this method is the complete conversion of the iron to iron carbide, which likewise entails great expenditures in terms of energy (substantial consumption of carbon-containing material in direct reduction).

According to the invention, a reducing gas generated in a melter gasifier is employed for reducing the fine ore, the dust content of said gas being between 20 and 100 g per $Nm^3$, with the dust having a carbon content of between 30 and 70 mass %. The dust content and the carbon content are adjustable by a hot gas cyclone and by the carbon carrier or by admixing f.i. metallurgical coke, coke breeze or petroleum coke into the melter gasifier. It is also feasible to charge mixtures of coals tending towards grain disintegration (decrepitation) with different degrees of intensity. The completely reduced fine ore is exposed to this specific reducing gas until the desired carbon content has been attained. The invention is based on the realization that the carbon content of the completely reduced fine ore increases exponentially, if exposed to the specific reducing gas in excess of the time required for complete reduction.

The reducing gas fed into the reduction zone preferably comprises between 40 and 90 g dust per $Nm^3$.

Another preferred variant of the process according to the invention is that the dust contained in the reducing gas has a carbon content of between 45 and 55 mass %.

In the process according to the invention, direct reduction can be carried out in two or several subsequently connected fluidized bed reactors and the reducing gas can be fed to the fluidized bed reactor arranged last in the direction of flow of the iron-oxide-containing material and passes through the latter and subsequently also through the other fluidized bed reactors in counterflow to the iron-oxide-containing material.

The increase in the carbon content of the sponge iron can be attained in that in the direct reduction operation the residence time of the iron-oxide-containing material is extended as compared to the minimum residence time required for completely reducing such material.

But the increase in carbon content may suitably also be attained in that reduction is carried out with a specific amount of reducing gas that is elevated as compared to the specific minimum amount of gas required for completely reducing the iron-oxide-containing material.

The invention will now be explained in greater detail with reference to an exemplary embodiment illustrated in the appended drawings.

Figure 1:
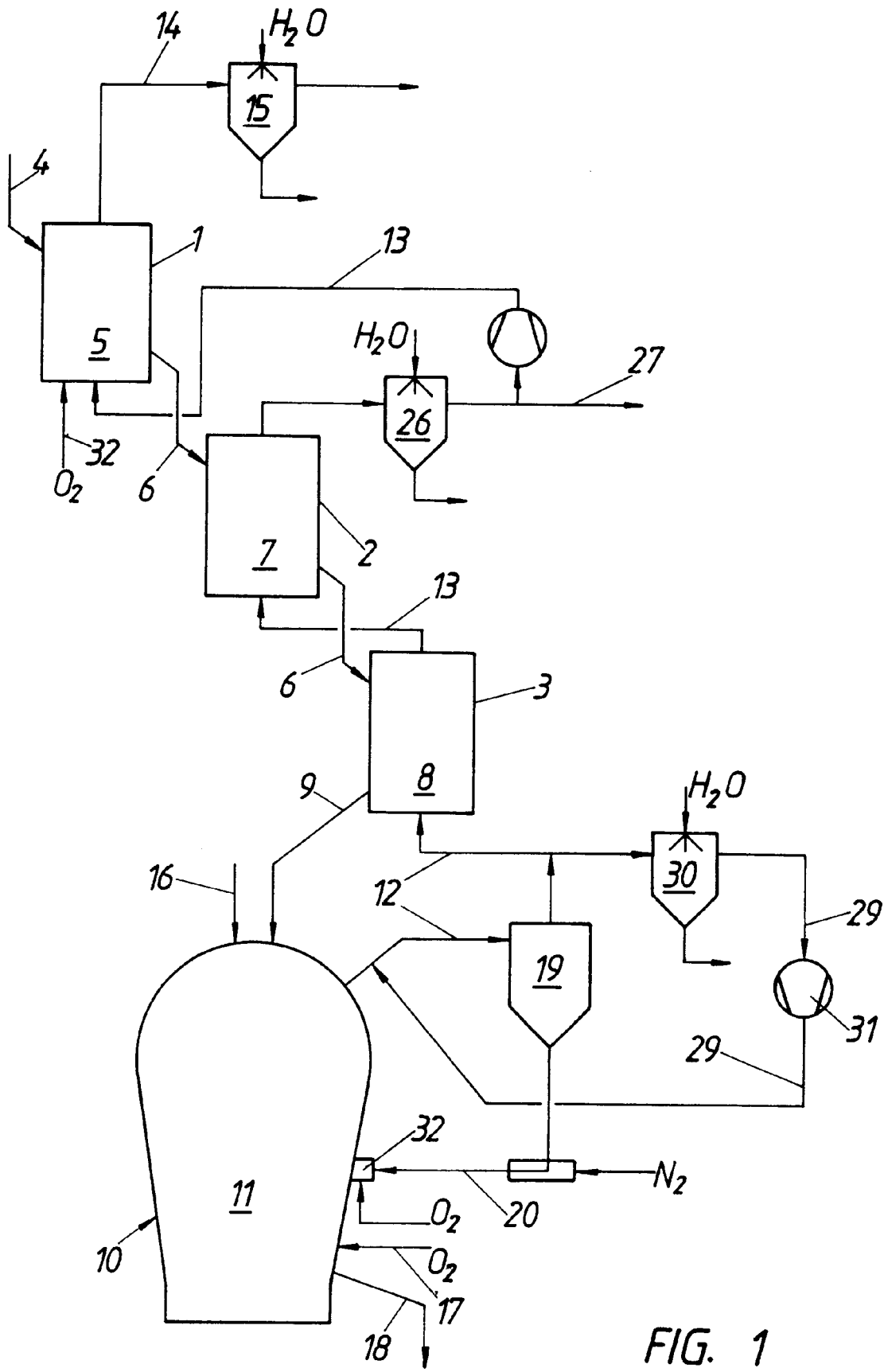
FIG. 1 is a diagrammatic representation of a plant according to this invention and also serves as a flow sheet for the process of the invention.

The plant is provided with three fluidized bed reactors 1 to 3 subsequently connected in series, wherein fine ore via an ore supply duct 4 is fed to the first fluidized bed reactor 1 in which in a preheating stage 5 preheating of the fine ore and optionally a prereduction take place and is subsequently conducted from fluidized bed reactor 1 to fluidized bed reactor 2, 3 via conveying ducts 6. Prereduction is effected in the fluidized bed reactor 2 in a prereduction stage 7, and a final reduction of the fine ore to sponge iron takes place in the fluidized bed reactor 3 in a final reduction stage 8.

Through a conveying duct 9, the completely reduced material, that is the sponge iron, is conducted into a melter gasifier 10. A reducing gas containing CO, $H_2$ and carbon-containing dust is produced from coal and oxygen-containing gas in a melt-down gasifying zone 11 within the melter gasifier 10 and in the reducing-gas feed duct 12 is introduced into the fluidized bed reactor 3 arranged last in the direction of flow of the fine ore, via a hot gas cyclone 19. The reducing gas subsequently is conducted from fluidized bed reactor 3 to fluidized bed reactor 2 to 1 in counterflow to the ore flow, via the connection ducts 13, is discharged from the fluidized bed reactor 1 as a top gas via a top-gas discharge duct 14 and subsequently is cooled and scrubbed in a wet scrubber 15.

The melter gasifier 10 is provided with a feed duct 16 for solid carbon carriers, a feed duct 17 for oxygen-containing gases as well as optionally feed ducts for carbon carriers, such as hydrocarbons, that are liquid or gaseous at room temperature as well as for burnt fluxes. In the melter gasifier 10, molten pig iron or molten steel pre-material and molten slag collect below the melt-down gasifying zone 11, which are tapped off via a tap 18.

In the reducing-gas feed duct 12 departing from the melter gasifier 10 and opening into the fluidized bed reactor 3, a hot gas cyclone 19 is provided which serves for adjusting in the reducing gas the dust content that is to be provided according to the invention, with the dust particles separated in said cyclone being fed to the melter gasifier 10 via the recirculating duct 20 with nitrogen as a conveying medium and passing via a burner 32 under oxygen injection.

The fluidized bed reactor 2, in which the prereduction of the fine ore takes place, is supplied with an equal amount of a reducing gas which, however, has a lower reduction potential, but this is absolutely sufficient for prereduction. As the attained degree of reduction of the material being reduced is lower here than in the final reduction stage 8, there is consequently no "sticking" here. The reacted reducing gas exiting this fluidized bed reactor 2 is conducted to a scrubber 26 via the duct 13. A portion of the washed and reacted reducing gas is withdrawn via an export-gas discharge duct 27; another portion is conducted to the preheating stage 5, that is to the fluidized bed reactor 1, via the duct 13.

A possibility for adjusting the reducing-gas temperature, which should be 750–950° C., preferably 800–850° C., arises due to the gas recycling duct 29 which is preferably provided and which departs from the reducing-gas feed duct 12 and via a scrubber 30 and a compressor 31 conducts a portion of the reducing gas back into this reducing-gas feed duct 12 again, namely at a position before the hot gas cyclone 19.

In order to adjust the preheating temperature of the fine ore it is feasible to supply an oxygen-containing gas, such as air or oxygen, to the preheating stage 5, that is, to the fluidized bed reactor 1, via a duct 32, whereby partial combustion of the reacted reducing gas supplied to the preheating stage 5 is effected. By controlling partial combustion it becomes feasible to adjust the temperature of the fine ore in the preheating operation in such a way that the temperatures in the subsequent reduction stages 7, 8 will be optimized.

The invention is not limited to the exemplary embodiment illustrated in the drawing but can be modified in various respects. For example, the number of fluidized bed reactors may be selected as a function of actual requirements.

EXAMPLE

In a plant corresponding to FIG. 1 of the drawing, 31.4 t coal/h having the chemical composition shown in Table I are charged to the melter gasifier 10 in order to produce 40 t pig iron/h and are gasified with 31,240 $Nm^3$ $O_2$/h.

TABLE I

| coal (dry) | |
|---|---|
| C | 78.9% |
| H | 3.8% |
| N | 1.0% |
| O | 2.0% |
| ashes | 8.7% |
| $C_{fix}$ | 72.0% |

To this plant, fine ore (hematite; grain size<8 mm) is charged in an amount of 58.6 t/h, at an ore analysis as shown in Table II, as well as fluxes in an amount of 8.6 t/h in accordance with Table III.

TABLE II

| ore (moist) | |
|---|---|
| Fe | 62.8% |
| $Fe_2O_3$ | 87.7% |
| LOI | 0.08% |
| moisture | 2.0% |

TABLE III

| fluxes | |
|---|---|
| CaO | 45.2% |
| MgO | 9.3% |
| $SiO_2$ | 1.2% |
| $Al_2O_3$ | 0.7% |
| loss on ignition | 39.1% |

In the melter gasifier 10, reducing gas is produced in an amount of 63,440 $Nm^3$/h and having a temperature of 1000 to 1200° C. This gas is withdrawn from the melter gasifier 10 and by admixing a reducing gas that has been cooled down in the scrubber 30 is adjusted to a temperature of 800° C. On leaving the cyclone 19, the reducing gas has the chemical composition shown in Table IV.

TABLE IV

| reducing gas for final reduction stage 8, 800° C. | |
|---|---|
| CO | 62% |
| $CO_2$ | 5% |
| $H_2$ | 28% |
| $N_2$ | 5% |
| dust | 80 g/Nm³ |
| C content of the dust | 50% |

TABLE V

| reducing gas for pre-reduction stage 7, 800° C. | |
|---|---|
| CO | 52% |
| $CO_2$ | 19% |
| $H_2$ | 24% |
| $N_2$ | 5% |

By adjusting the residence time of this reducing gas in the final reduction stage 8 it is possible to adjust the carbon content of the sponge iron. The connection between the residence time and the carbon content is illustrated in FIG. 2, where the abscissa indicates the residence time in minutes and the ordinate the carbon content of the sponge iron in mass %.

Figure 2:
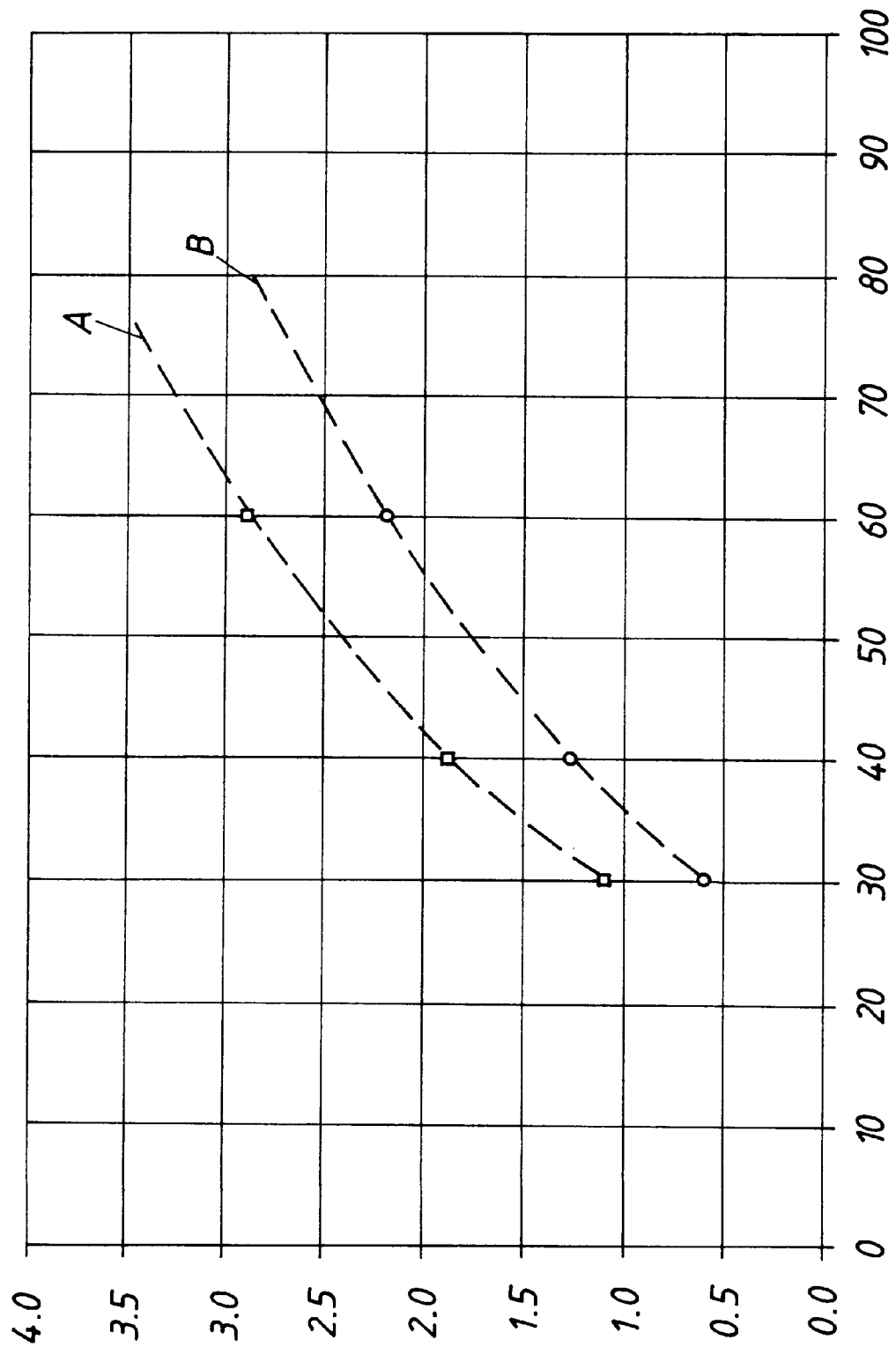
FIG. 2 is a graph evidencing that the carbon content of the sponge iron increases both with residence time and with the specific reducing has consumption.

In FIG. 2, Graph A relates to a specific reducing gas consumption of 1500 Nm³/t ore. Graph B relates to a specific reducing gas rate of 1200 Nm³/t ore. It can thus be seen from FIG. 2 that the carbon content of the sponge iron increases both with residence time and with the specific reducing gas consumption.

Figure 3:
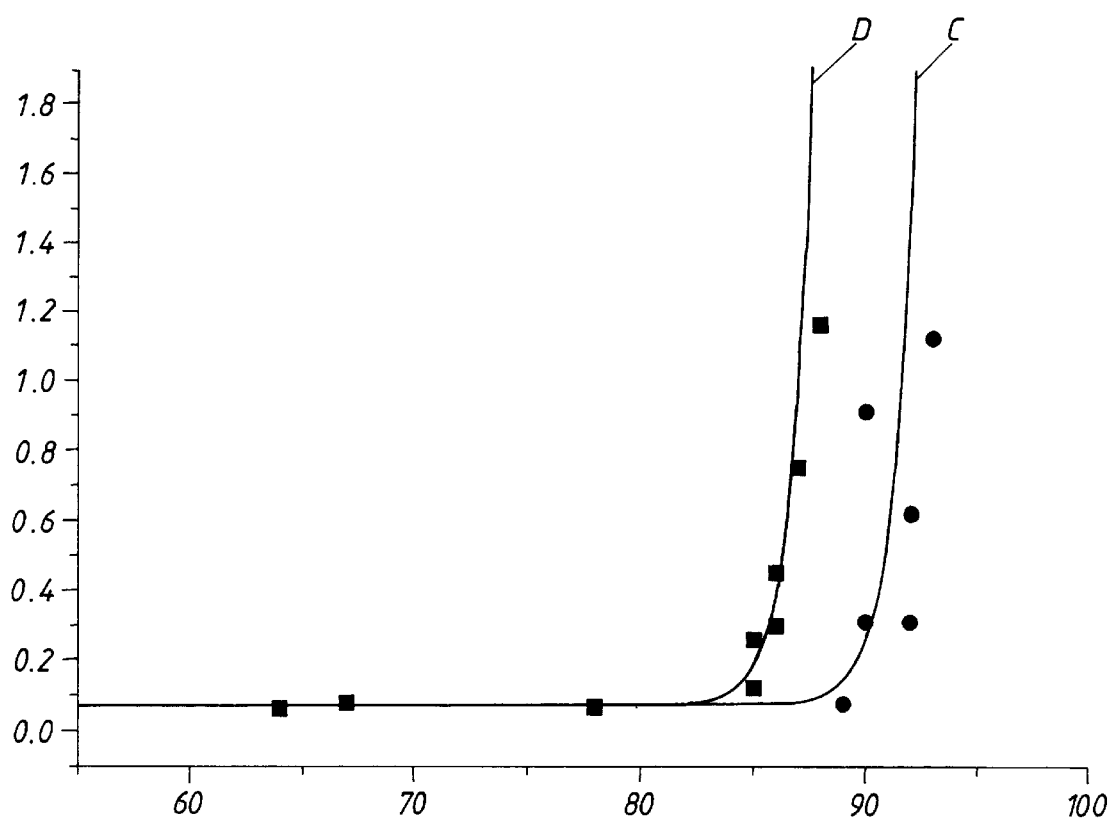
FIG. 3 is a graph evidencing that the carbon content will only increase if the ore has been completely reduced.

It has become apparent that such elevated carbon contents can only be attained if the fine ore has been completely reduced and subsequently continues for some time to be exposed to the reducing gas. The connection between the degree of reduction and the carbon content of the sponge iron is illustrated in FIG. 3, where the degree of reduction ($Fe_{Met}/Fe_{tot}$) in % has been plotted as the abscissa and the carbon content (mass %) as the ordinate. Graph C relates to reduction at 850° C. and Graph D relates to reduction at 800° C.

From FIG. 3 it can be seen that the carbon content will only increase if the ore has been completely reduced, with the term "complete reduction" being understood to denote the degree of reduction that is maximally attainable under the given reduction conditions. Graph C shows the ore which has been completely reduced at 850° C. to have a degree of reduction of about 90 to 92%, while Graph D shows the ore which has been completely reduced at 800° C. to have a degree of reduction of about 85 to 87%. If such completely reduced ore remains in contact with the reducing gas employed according to the invention even longer, there will be just an insignificant increase in the degree of reduction, whereas the carbon content will increase heavily. It is therefore possible in this way to produce a sponge iron of elevated carbon content.

What is claimed is:

1. A process for producing sponge iron by directly reducing particulate, iron-oxide-containing material, wherein reducing gas that is formed from carbon carriers and an oxygen-containing gas in a melt-down gasifying zone is introduced into a reduction zone that contains the iron-oxide-containing material, characterized by the combination of the following characteristic features:

to the reduction zone, a reducing gas is fed which contains between 20 and 100 g per Nm³ of a dust having a carbon content of between 30 and 70 mass %, and the iron-oxide-containing material is exposed to the reducing gas for a time period that exceeds the period required for complete reduction.

2. A process according to claim 1, characterized in that the reducing gas fed to the reduction zone contains between 40 and 90 g dust per Nm³.

3. A process according to claim 1, characterized in that the dust contained in the reducing gas has a carbon content of between 45 and 55 mass %.

4. A process according to claim 1, characterized in that direct reduction is carried out in two or several subsequently connected fluidized bed reactors and the reducing gas is fed to the fluidized bed reactor arranged last in the direction of flow of the iron oxide-containing material and passes through said iron oxide material and subsequently also through the other fluidized bed reactors in counterflow to the iron oxide-containing material.

5. A process according to claim 1, characterized in that in the direct reduction operation the residence time exceeds the residence time required for completely reducing the iron oxide-containing material.

6. A process according to claim 1, characterized in that reduction is carried out with an amount of reducing gas in excess of the amount of gas required for completely reducing the iron oxide-containing material.

* * * * *

UNITED STATES PATENT AND TRADEMARK OFFICE
CERTIFICATE OF CORRECTION

PATENT NO.    : 6,149,708
DATED         : November 21, 2000
INVENTOR(S)   : Kepplinger et al.

It is certified that error appears in the above-identified patent and that said Letters Patent is hereby corrected as shown below:

<u>Title page,</u>
Item [73], Assignee, please add the following Assignees:

-- Pohang Iron & Steel Co., Ltd., Pohang City, Republic of Korea
Research Institute of Industrial Science & Tehnology, Incorporated Foundation, Pohang City, Republic of Korea --

Signed and Sealed this

Fourteenth Day of January, 2003

JAMES E. ROGAN
*Director of the United States Patent and Trademark Office*